United States Patent
Liu et al.

(10) Patent No.: US 10,091,515 B2
(45) Date of Patent: Oct. 2, 2018

(54) METHOD AND APPARATUS FOR INTRA MODE DERIVATION AND CODING IN SCALABLE VIDEO CODING

(71) Applicants: Shan Liu, San Jose, CA (US); Mei Guo, San Jose, CA (US); Tzu-Der Chuang, Hsinchu County (TW); Shaw-Min Lei, Hsinchu County (TW)

(72) Inventors: Shan Liu, San Jose, CA (US); Mei Guo, San Jose, CA (US); Tzu-Der Chuang, Hsinchu County (TW); Shaw-Min Lei, Hsinchu County (TW)

(73) Assignee: MEDIATEK SINGAPORE PTE. LTD, Singapore (SG)

( * ) Notice: Subject to any disclaimer, the term of this patent is extended or adjusted under 35 U.S.C. 154(b) by 649 days.

(21) Appl. No.: 14/378,949

(22) PCT Filed: Mar. 11, 2013

(86) PCT No.: PCT/CN2013/072403
§ 371 (c)(1),
(2) Date: Aug. 14, 2014

(87) PCT Pub. No.: WO2013/139212
PCT Pub. Date: Sep. 26, 2013

(65) Prior Publication Data
US 2015/0304670 A1    Oct. 22, 2015

Related U.S. Application Data

(60) Provisional application No. 61/613,737, filed on Mar. 21, 2012, provisional application No. 61/676,678, filed on Jul. 27, 2012.

(30) Foreign Application Priority Data

Mar. 29, 2012 (CN) .................. PCT/CN2012/073253

(51) Int. Cl.
*H04N 19/34* (2014.01)
*H04N 19/96* (2014.01)
(Continued)

(52) U.S. Cl.
CPC ............. *H04N 19/34* (2014.11); *H04N 19/11* (2014.11); *H04N 19/157* (2014.11);
(Continued)

(58) Field of Classification Search
CPC .... H04N 19/103; H04N 19/11; H04N 19/127; H04N 19/147; H04N 19/17;
(Continued)

(56) References Cited

U.S. PATENT DOCUMENTS

| 7,899,115 B2 | 3/2011 | Jeon et al. | |
| 2002/0118742 A1* | 8/2002 | Puri | H04N 19/63 375/240.1 |

(Continued)

FOREIGN PATENT DOCUMENTS

| CN | 101204094 A | 6/2008 |
| CN | 101945270 A | 1/2011 |

(Continued)

OTHER PUBLICATIONS

Wang et al.; Inter Layer Intra Prediction Using Lower Layer Information for Spatial Scalability; 2006; ICIC; LNCIS 345, pp. 303-311.*

(Continued)

*Primary Examiner* — Peter D Le
(74) *Attorney, Agent, or Firm* — McClure, Qualey & Rodack, LLP

(57) ABSTRACT

A method and apparatus of Intra mode coding for a scalable video coding system are disclosed. For a current Intra-coded block in the enhancement layer (EL), predictive coding is applied to the current Intra mode based on the base layer (Continued)

(BL) coding mode associated with the co-located block in the BL and neighboring coding modes associated with neighboring blocks of the current block in the EL. The neighboring blocks of the current block in the EL comprise a left block adjacent to a left side of the current block and a top block adjacent to a top side of the current block. One or more most probable modes (MPMs) can be derived from the neighboring coding modes and the BL coding mode, and the MPMs is then used for predictive coding of the current Intra mode.

22 Claims, 7 Drawing Sheets

(51) Int. Cl.
  *H04N 19/11* (2014.01)
  *H04N 19/463* (2014.01)
  *H04N 19/187* (2014.01)
  *H04N 19/176* (2014.01)
  *H04N 19/157* (2014.01)
  *H04N 19/159* (2014.01)

(52) U.S. Cl.
  CPC ......... *H04N 19/159* (2014.11); *H04N 19/176* (2014.11); *H04N 19/187* (2014.11); *H04N 19/463* (2014.11); *H04N 19/96* (2014.11)

(58) Field of Classification Search
  CPC .. H04N 19/172; H04N 19/176; H04N 19/179; H04N 19/19; H04N 19/61
  See application file for complete search history.

(56) References Cited

U.S. PATENT DOCUMENTS

| | | | | |
|---|---|---|---|---|
| 2002/0150158 A1* | 10/2002 | Wu | ........................ | H04N 19/34 375/240.12 |
| 2004/0008771 A1* | 1/2004 | Karczewicz | ......... | H04N 19/197 375/240.03 |
| 2005/0069211 A1* | 3/2005 | Lee | ...................... | H04N 19/172 382/239 |
| 2005/0157797 A1* | 7/2005 | Gaedke | ................ | H04N 19/105 375/240.24 |
| 2005/0195896 A1* | 9/2005 | Huang | ................... | H04N 19/61 375/240.03 |
| 2006/0104354 A1* | 5/2006 | Han | ..................... | H04N 19/159 375/240.03 |
| 2006/0120450 A1* | 6/2006 | Han | ..................... | H04N 19/176 375/240.03 |
| 2006/0146941 A1* | 7/2006 | Cha | ........................ | H04N 19/61 375/240.29 |
| 2006/0153295 A1* | 7/2006 | Wang | ................... | H04N 19/159 375/240.08 |
| 2006/0153300 A1* | 7/2006 | Wang | ................... | H04N 19/56 375/240.16 |
| 2006/0215763 A1* | 9/2006 | Morimoto | ............ | H04N 19/159 375/240.18 |
| 2006/0222067 A1* | 10/2006 | Park | .................... | H04N 19/105 375/240.08 |
| 2006/0262216 A1* | 11/2006 | Zhai | .................... | H04N 19/176 348/394.1 |
| 2007/0286283 A1* | 12/2007 | Yin | ....................... | H04N 19/70 375/240.16 |
| 2008/0260043 A1* | 10/2008 | Bottreau | .............. | H04N 19/105 375/240.26 |
| 2008/0304566 A1* | 12/2008 | Yoon | ................... | H04N 19/105 375/240.12 |
| 2009/0074061 A1* | 3/2009 | Yin | ....................... | H04N 19/176 375/240.15 |
| 2010/0220789 A1* | 9/2010 | Yuwen | ................... | H04N 19/61 375/240.16 |
| 2011/0038415 A1* | 2/2011 | Min | ..................... | H04N 19/115 375/240.12 |
| 2011/0110426 A1* | 5/2011 | Kim | ..................... | H04N 19/105 375/240.13 |
| 2011/0164677 A1 | 7/2011 | Lu et al. | | |
| 2011/0170592 A1* | 7/2011 | Kim | ..................... | H04N 19/176 375/240.03 |
| 2011/0243229 A1* | 10/2011 | Kim | ..................... | H04N 19/176 375/240.13 |
| 2011/0286520 A1* | 11/2011 | Xu | ........................ | H04N 19/176 375/240.12 |
| 2011/0317757 A1* | 12/2011 | Coban | .................. | H04N 19/197 375/240.02 |
| 2012/0020580 A1* | 1/2012 | Sasai | .................... | H04N 19/176 382/233 |
| 2012/0082222 A1* | 4/2012 | Wang | ................... | H04N 19/176 375/240.12 |
| 2012/0106636 A1* | 5/2012 | Kim | ..................... | H04N 19/176 375/240.12 |
| 2012/0314767 A1* | 12/2012 | Wang | ................... | H04N 19/105 375/240.12 |
| 2012/0327999 A1* | 12/2012 | Francois | ................ | H04N 19/11 375/240.02 |
| 2013/0022119 A1* | 1/2013 | Chien | .................. | H04N 19/159 375/240.16 |
| 2013/0051469 A1* | 2/2013 | Park | ....................... | H04N 19/159 375/240.14 |
| 2013/0114707 A1* | 5/2013 | Seregin | .................. | H04N 19/11 375/240.12 |
| 2013/0136175 A1* | 5/2013 | Wang | ............... | H04N 19/00781 375/240.12 |
| 2013/0170546 A1* | 7/2013 | Kim | ....................... | H04N 19/50 375/240.12 |
| 2013/0188719 A1* | 7/2013 | Chen | ............... | H04N 19/00684 375/240.16 |
| 2013/0230095 A1* | 9/2013 | Mathew | ........... | H04N 19/00448 375/240.02 |
| 2013/0272402 A1* | 10/2013 | Tu | .......................... | H04N 19/52 375/240.13 |
| 2014/0133558 A1* | 5/2014 | Seregin | ................ | H04N 19/105 375/240.12 |

FOREIGN PATENT DOCUMENTS

| | | |
|---|---|---|
| CN | 102025995 A | 4/2011 |
| CN | 102088608 A | 6/2011 |
| WO | 2008047929 A1 | 4/2008 |
| WO | WO 2014/047881 | 4/2014 |

OTHER PUBLICATIONS

Wang, Z., et al.; "A New Intra Coding Method for Spatial Scalability Video Coding;" IEEE; 2006; pp. 1-2.

Kim, C., et al.; "Description of Scalable Video Coding Technology Proposal by LG Electronics and MediaTek (differential coding mode on);" Joint Collaborative Team on Video Coding (JCT-VC) of ITU-T SG16 and ISO/IEC JTC1/SC29/WG11; Oct. 2012; pp. 1-19.

Guo, M., et al.; "Inter-layer Intra Mode Prediction;" Joint Collaborative Team on Video Coding (JCT-VC) of ITU-T SG16 and ISO/IEC JTC1/SC29/WG11; Jan. 2013; pp. 1-3.

Chuang, T.D., et al.; "Luma Intra Prediction Mode Coding;" Joint Collaborative Team on Video Coding (JCT-VC) of ITU-T SG16 and ISO/IEC JTC1/SC29/WG11; Jul. 2011; pp. 1-3.

\* cited by examiner

| (0,0) | (1,0) | (2,0) | (3,0) |
|---|---|---|---|
| (0,1) | (1,1) | (2,1) | (3,1) |
| (0,2) | (1,2) | (2,2) | (3,2) |
| (0,3) | (1,3) | (2,3) | (3,3) |
*Fig. 8*
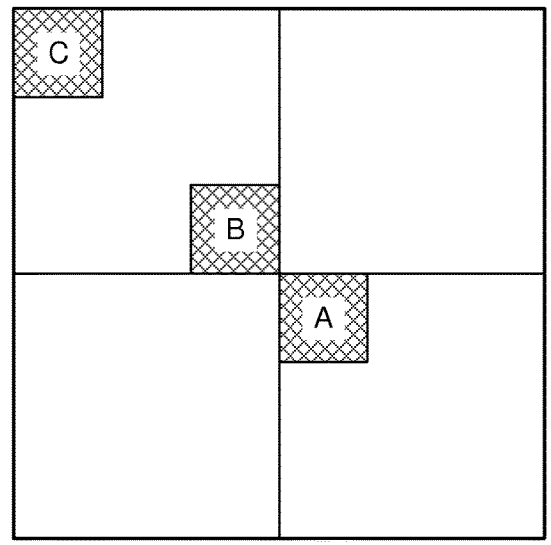
*Fig. 9*
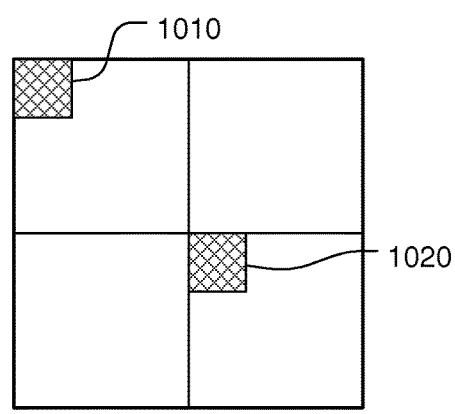
*Fig. 10*

METHOD AND APPARATUS FOR INTRA MODE DERIVATION AND CODING IN SCALABLE VIDEO CODING

FIELD OF INVENTION

The present invention relates to scalable video coding. In particular, the present invention relates to Intra mode coding techniques for blocks in the enhancement layer.

BACKGROUND OF THE INVENTION

Video streaming has become a mainstream for video delivery today. Supported by the high-speed ubiquitous internet as well as mobile networks, video contents can be delivered to end users for viewing on different platforms with different qualities. In order to fulfill different requirements for various video stream applications, a video source may have to be processed or stored at different resolutions, frame rates, and/or qualities. It would result in fairly complicated system and require high overall bandwidth or large overall storage space. One solution to satisfy requirements for different resolutions, frame rates, qualities and/or bitrates is scalable video coding. Beside various proprietary development efforts to address this problem, there is also an existing video standard for scalable video coding. The joint video team (JVT) of ISO/IEC MPEG and ITU-T VCEG has standardized a Scalable Video Coding (SVC) extension to the H.264/AVC standard. An H.264/AVC SVC bitstream can contain video information ranging from low frame-rate, low resolution and low quality to high frame rate, high definition and high quality. This single bitstream can be adapted to a specific application by properly configuring the scalability of the bitstream. For example, the complete bitstream corresponding to a high definition video can be delivered over high-speed networks to provide full quality intended for viewing on large screen TV. A portion of the bitstream corresponding to a low-resolution version of the high definition video can be delivered over legacy cellular networks for intended viewing on handheld/mobile devices. Accordingly, a bitstream generated using H.264/AVC SVC is suitable for various video applications such as video broadcasting, video streaming, and surveillance.

In SVC, three types of scalabilities, i.e., temporal scalability, spatial scalability, and quality scalability are provided. SVC uses a multi-layer coding structure to render three dimensions of scalability. The concept of SVC is to generate one scalable bitstream that can be easily and quickly adapted to fit the bit-rate of various transmission channels, diverse display capabilities, and/or different computational resources without the need of transcoding or re-encoding. An important feature of SVC design is to provide scalability at the bitstream level. Bitstreams for a reduced spatial and/or temporal resolution can be simply obtained by discarding NAL units (or network packets) that are not required for decoding the target resolution. NAL units for quality refinement can be additionally truncated in order to reduce the bit-rate and/or the corresponding video quality.

In the H.264/AVC SVC extension, spatial scalability is supported based on the pyramid coding. First, the video sequence is down-sampled to smaller pictures with different spatial resolutions (layers). The lowest layer (i.e., the layer with lowest spatial resolution) is called a base layer (BL). Any layer above the base layer is called an enhancement layer (EL). In addition to dyadic spatial resolution, the H.264/AVC SVC extension also supports arbitrary resolution ratios, which is called extended spatial scalability (ESS). In order to improve the coding efficiency of the enhancement layers (video layers with larger resolutions), various inter-layer prediction schemes have been disclosed in the literature. Three inter-layer prediction tools have been adopted in SVC, including inter-layer motion prediction, inter-layer Intra prediction and inter-layer residual prediction (e.g., C. Andrew Segall and Gary J. Sullivan, "Spatial Scalability Within the H.264/AVC Scalable Video Coding Extension", IEEE Transactions on Circuits and Systems for Video Technology, Vol. 17, No. 9, Pages 1121-1135, September 2007).

FIG. 1 illustrates an example of spatial scalability design according to H.264/AVC SVC. Base layer encoder 110 receives a lower resolution video sequence as input and encodes the low-resolution sequence using conventional H.264/AVC video coding. Coding mode selection 112 can select a prediction mode between Intra-prediction and motion-compensated Inter-prediction. Enhancement layer encoder 120 receives a higher resolution sequence as input. The higher resolution sequence can be encoded with a structure similar to the conventional H.264/AVC coding. However, inter-layer prediction 130 can be used as an additional coding mode. Accordingly, mode selection 122 for the enhancement layer can select a prediction mode among Intra-prediction, motion-compensated Inter-prediction and inter-layer prediction. For the case of Intra-coded blocks in the base layer, reconstructed blocks provide a prediction for the enhancement layer. For the case of Inter-coded blocks in the base layer, motion vectors and residual difference information of the base layer can be used to predict those of the enhancement layer. While two resolution layers are shown in FIG. 1 as an example of spatial scalability according to H.264/AVC SVC, more resolution layers can be added, which a higher-resolution enhancement layer can use either the base layer or previously transmitted enhancement layers for inter-layer prediction. Furthermore, other forms of SVC enhancement (e.g., temporal or quality) may also be present in the system.

In H.264/AVC SVC, the reconstructed blocks, motion vectors, or residual information associated with lower layers are used for inter-layer coding. It is desirable to utilize other coding information associated with lower layers to further improve coding efficiency and/or reduce system complexity.

HEVC (High Efficiency Video Coding) is an advanced video coding system being developed under the Joint Collaborative Team on Video Coding (JCT-VC) group of video coding experts from ITU-T Study Group. In HEVC Test Model Version 6.0 (HM-6.0), the prediction unit (PU) for Intra coding can be 64×64, 32×32, 16×16, 8×8, or 4×4. A total of 35 Intra prediction modes, i.e., mode 0 to mode 34 are used for all PU sizes as shown in FIG. 2A. In addition, mode 35 (i.e., Intra_FromLuma) is only used for the chroma component when chroma Intra prediction based on luma Intra prediction is allowed (i.e., when chroma_pred_from_luma_enabled_flag=1). The Intra prediction mode is also called Intra mode in this disclosure.

For Intra prediction mode coding of the luma component in HM-6.0, three most probable modes (denoted as candModeList[x], x=0 to 2) are derived for a current luma PU, 210 based on the Intra modes of neighboring PUs (220 and 230) as shown in FIG. 2B. The Intra mode of the left PU, 220 (denoted as candIntraPredModeA) and the Intra mode of the top PU, 230 (denoted as candIntraPredModeB) are used to derive the most probable modes, candModeList[x], as follows:

If candIntraPredModeB is equal to candIntraPredModeA, the following applies:
  If candIntraPredModeA is less than 2 (i.e., Intra_Planar or Intra_DC mode), candModeList[x], x=0 to 2 is derived as:
    candModeList[0]=Intra_Planar
    candModeList[1]=Intra_DC
    candModeList[2]=Intra_Angular (26)
  Otherwise, candModeList[x], x=0 to 2 is derived as:
    candModeList[0]=candIntraPredModeA
    candModeList[1]=2+((candIntraPredModeA−2−1) % 32
    candModeList[2]=2+((candIntraPredModeA−2+1) % 32
Otherwise (candIntraPredModeB is not equal to candIntraPredModeA), the following applies:
  candModeList[0] and candModeList[1] are derived as follows:
    candModeList[0]=candIntraPredModeA
    candModeList[1]=candIntraPredModeB
  If none of candModeList[0] and candModeList[1] is equal to Intra_Planar, candModeList[2] is set equal to Intra_Planar,
  Otherwise,
    If none of candModeList[0] and candModeList[1] is equal to Intra_DC, candModeList[2] is set equal to Intra_DC,
    Otherwise, candModeList[2] is set equal to Intra_Angular (26).

If the neighboring PU adjacent to the left side or the top side of the current PU is not available or is not Intra coded, candIntraPredModeA or candIntraPredModeB is set to Intra_DC. Intra_Planar and Intra_DC correspond to the Planar mode and the DC mode respectively. Therefore, Intra_Planar/Intra_DC and the Planar mode/DC mode are used interchangeably in this disclosure.

If the current Intra mode (denoted as IntraPredMode) is equal to any of the most probable modes in candModeList, the value of flag prev_intra_pred_flag is set to 1 to indicate the case. An index is then sent to identify the mode (i.e., IntraPredMode) in candModeList. If the current Intra mode is not equal to any of the most probable modes in candModeList, then the current Intra mode is among one of the remaining modes. The remaining mode (denoted as rem_intra_luma_pred_mode) that is equal to IntraPredMode is transmitted to identify IntraPredMode. The occurrence of the remaining mode is indicated by a preceding flag, prev_intra_pred_flag having a value equal to 0.

In HM-6.0, Intra mode coding for the chroma PU may have 5 or 6 candidate modes depending on chroma_pred_from_luma_enabled_flag. If chroma_pred_from_luma_enabled_flag is equal to 1, 6 possible chroma modes are used as shown in Table 1. Otherwise, 5 candidate modes are used as shown in Table 2.

TABLE 1

| | IntraPredMode | | | | |
|---|---|---|---|---|---|
| intra_chroma_pred_mode | 0 | 26 | 10 | 1 | X (0 <= X < 35) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | LM | LM | LM | LM | LM |
| 5 | 0 | 26 | 10 | 1 | X |

TABLE 2

| | IntraPredMode | | | | |
|---|---|---|---|---|---|
| intra_chroma_pred_mode | 0 | 26 | 10 | 1 | X |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

To support spatial scalability for blocks coded in Intra mode, the scalable extension of H.264/AVC includes a new Intra coding type (denoted as Intra_BL) for Intra-coded macroblocks based inter-layer information from a base layer. When a macroblock in a higher layer is coded according to the Intra_BL coding type and the co-located 8×8 sub-macroblock in its reference layer is Intra coded, the prediction signal for the macroblock in higher layer can be derived from the corresponding reconstructed block in the reference layer. The 8×8 sub-macroblock in the reference layer is up-sampled to generate the prediction.

A scalable extension to HEVC is being developed by the Joint Collaborative Team on Video Coding (JCT-VC) group of video coding experts from ITU-T Study Group. An inter-layer texture prediction technique similar to Intra_BL of H.264/AVC SVC can be applied to coding the enhancement layer picture. A coding tool, the inter-layer differential coding method was also proposed to the scalable extension of HEVC (referred as SHVC) where the residues between the original video data at an enhancement layer and the reconstructed base layer is compressed using both motion-compensated Inter coding and Intra prediction coding methods. The reconstructed base layer has to be up-sampled or scaled to the same spatial resolution as the original video data at an enhancement layer in order to form the residues at the enhancement layer. In this case, the reference samples used for motion compensation or Intra prediction are the reconstructed residues between the already reconstructed video data at the enhancement layer and the corresponding reconstructed video data at the base layer. Again, the reconstructed video data at the base layer has to be up-sampled or scaled to match the spatial resolution of the reconstructed video data at the enhancement layer.

An exemplary two-layer HEVC SVC system is shown in FIG. 3. A conventional HEVC coder can be used as the base layer coder (310), where motion compensated Prediction (M.C. Pred.) 312 is used for inter-frame coding. The coder for the enhancement layer (320) is similar to the conventional HEVC coder except that the M.C./Inter-layer Prediction 322 also supports inter-layer prediction in addition to Inter-frame prediction. The input to base layer coder 310 is derived from the higher-resolution input video data by applying spatial decimation 330 to the higher-resolution input video data. On the other hand, in order to use the reconstructed base layer data for inter-layer prediction, the reconstructed base layer data needs to be up-sampled or scaled by up-sampling 324.

It is desirable to improve the coding efficiency of a SVC system or reducing the complexity of the SVC system by exploiting the correlation associated with the Intra modes from different layers without causing any noticeable impact on video quality or performance.

In SVC, the enhancement layer (EL) can reuse the motion information in the base layer (BL) to reduce the inter-layer motion data redundancy as mentioned before. In EL macroblock coding, a flag, base_mode_flag can be coded before mb_type to indicate whether the EL motion information is directly derived from the BL or not. If base_mode_flag is equal to 1, the partitioning data of the EL macroblock along with the associated reference indexes and motion vectors can be derived from the corresponding data of the co-located 8×8 block in the BL. The reference index of BL can be directly used in the EL. The macroblock partitioning and motion vectors of the EL can be determined based on the scaled data of macroblock partitioning and motion vectors of the BL. In addition, the scaled BL motion vector can be used as an additional motion vector predictor for the EL.

Inter-layer residual coding can use the up-sampled BL residual information as prediction to reduce the information required for the EL residual. The co-located residual of the BL can be block-wise up-sampled using a bilinear filter and the up-scaled block can be used as prediction for the residual of current macroblock in the EL. The up-sampling of the reference layer residual can be performed on a transform block basis in order to ensure that no filtering is applied across transform block boundaries.

The inter-layer texture prediction reduces the redundant texture information of the EL. The prediction for the EL is generated by block-wise up-sampling the co-located reconstructed BL block. In the up-sampling process for the inter-layer texture prediction, a 4-tap and 2-tap FIR filter can be applied to the luma and chroma components respectively. Unlike filtering for the inter-layer residual prediction, filtering is always performed across sub-block boundaries for the inter-layer texture prediction. For decoding simplicity, inter-layer texture prediction can be restricted to Intra-coded macroblocks in the BL.

While inter-layer residual prediction and inter-layer texture prediction have been used for SVC, it is desirable to further improve the performance.

SUMMARY OF THE INVENTION

A method and apparatus of Intra mode coding for a scalable video coding system are disclosed. The video data is configured into a Base Layer (BL) and an Enhancement Layer (EL), where the EL has higher spatial resolution or better video quality than the BL. A co-located block in the BL corresponding to a current block in the EL is coded before the current block. For the current EL block coded in an Intra mode, embodiments of the present invention applies predictive coding to the current Intra mode based on the BL coding mode associated with the co-located block in the BL and neighboring coding modes associated with neighboring blocks of the current block in the EL. The neighboring blocks of the current block in the EL comprise a left block adjacent to a left side of the current block and a top block adjacent to a top side of the current block, where the left block is associated with a left-block coding mode and the top block is associated with a top-block coding mode. One or more most probable modes (MPMs) can be derived from the neighboring coding modes and the BL coding mode, and the MPMs can be used for predictive coding of the current Intra mode. In some embodiments, the BL coding mode is used to derive the first most probable mode of the MPMs.

In some embodiments, the MPMs are used to code the current Intra mode. If none of the BL coding mode, the left-block coding mode and the top-block coding mode is an Intra mode, the three most probable modes may correspond to {Planar mode, DC mode, Vertical mode}. If one or more than one of the BL coding mode, the left-block coding mode and the top-block coding mode are Intra mode, and they correspond to a same Intra mode and the same Intra mode is the Planar mode or the DC mode, the three most probable modes correspond to {Planar mode, DC mode, Vertical mode}. If one or more than one of the BL coding mode, the left-block coding mode and the top-block coding mode are Intra modes and they correspond to a same Intra mode and the same Intra mode is neither the Planar mode nor the DC mode, the three most probable modes correspond to {said same Intra mode, (said same Intra mode−1), (said same Intra mode+1)}. If two or more than two of the BL coding mode, the left-block coding mode and the top-block coding mode are Intra modes and they correspond to a first Intra mode and a second Intra mode, and the first Intra mode is different from the second Intra mode; the three most probable modes correspond to {the first Intra mode, the second Intra mode, Planar mode} if neither the first Intra mode nor the second Intra mode equals to the Planar mode; otherwise, the three most probable modes correspond to {the first Intra mode, the second Intra mode, DC mode} if neither the first Intra mode nor the second Intra mode equals to the DC mode; and the three most probable modes correspond to {the first Intra mode, the second Intra mode, Vertical mode} otherwise. If the BL coding mode, the left-block coding mode and the top-block coding mode correspond to three different Intra modes, the three most probable modes correspond to {the BL coding mode, the left-block coding mode, the top-block coding mode}.

In other embodiments, if the BL coding mode, the left-block coding mode or the top-block coding mode is the Planar mode or the DC mode, the Planar mode or the DC mode is excluded from the initial assignment of the three most probable modes. Accordingly, if none of the BL coding mode, the left-block coding mode and the top-block coding mode is an Intra mode, the three most probable modes correspond to {DC mode, Vertical mode, Horizontal mode}. If one of more than one of the BL coding mode, the left-block coding mode and the top-block coding mode are Intra modes but not DC or Planar, and they correspond to a same angular Intra mode, the three most probable modes correspond to {the same angular Intra mode, (the same angular Intra mode−1), (the same angular Intra mode+1)}. If two or more than two of the BL coding mode, the left-block coding mode and the top-block coding mode are Intra modes and they correspond to a first Intra mode and a second Intra mode, and the first Intra mode is different from the second Intra mode, the three most probable modes correspond to {the first Intra mode, the second Intra mode, DC mode}. If the BL coding mode, the left-block coding mode and the top-block coding mode correspond to three different Intra modes, the three most probable modes correspond to {BL coding mode, left-block coding mode, top-block coding mode}.

In yet other embodiments, only one most probable modes is used for Intra mode coding of the current Intra mode. The most probable mode corresponds to the BL coding mode if the BL coding mode corresponds to a first Intra mode not equal to the Planar mode or the DC mode. The most probable mode corresponds to the left-block coding mode if the BL coding mode is not any Intra mode and the left-block coding mode corresponds to a second Intra mode not equal to the Planar mode or the DC mode. The most probable mode corresponds to the top-block coding mode if the BL coding mode and the left-block coding mode are not any Intra mode and the top-block coding mode corresponds to a third Intra mode not equal to the Planar mode or the DC mode. As a result the enhancement layer allows 33 angular Intra prediction mode. With one MPM, 32 remaining modes can be represented by 5 bin fixed length coding.

In yet another embodiment, if a neighboring coding mode associated with a neighboring block of the current block in the EL is not an Intra mode, the neighboring coding mode is replaced by a neighboring BL coding mode for predictive coding of the current Intra mode, if it is Intra mode, where the neighboring BL coding mode is associated with a neighbor co-located block in the BL corresponding to said one neighboring block of the current block in the EL.

BRIEF DESCRIPTION OF THE DRAWINGS

FIG. 8 illustrates the pixel location labeling of a 4×4 unit for determining a BL Intra mode used in the most probable mode derivation.

FIG. 9 illustrates an example of selecting a 4×4 unit (A, B or C) within a larger unit for determining a BL Intra mode used in the most probable mode derivation.

FIG. 10 illustrates an example of determining the prediction mode for a current block in the enhancement layer based on the prediction mode of a co-located block in base layer corresponding to the current block.

DETAILED DESCRIPTION

Figure 4:
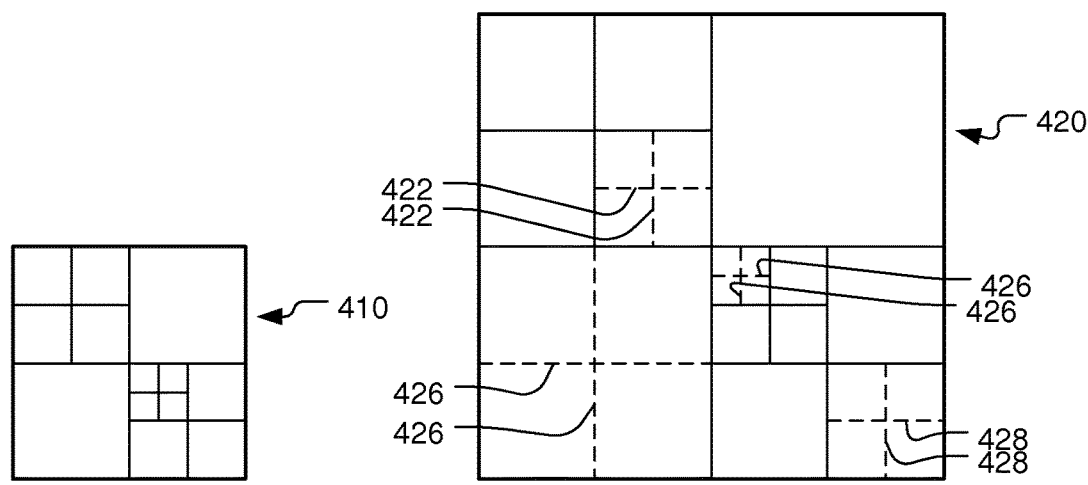
FIG. 4 illustrates an example that the EL LCU inherits the LCU structure of the corresponding BL LCU according to an embodiment of the present invention.

In HEVC coding, a picture is partitioned into largest coding units (LCUs) or coding tree blocks (CTBs) where each LCU (CTB) can be adaptively partitioned coding blocks using a quadtree. An LCU size may be chosen from a set of allowable sizes and information associated with the LCU size may have to be incorporated in the bitstream so that a decoder can recover the same information. The picture is coded or decoded LCU by LCU in the raster scan order. In one embodiment of the present invention, the LCU size for the enhancement layer is inferred from the LCU size for the base layer multiplied by a scaling factor, a in both vertical and horizontal directions without signaling in a system with dyadic spatial scalability. Parameter a is the spatial scalability factor, i.e. the ratio of EL picture resolution to BL picture resolution. For example, the EL LCU size is inferred as 128 if the BL LCU size is 64 for 2× spatial scalability. An example of LCU size inference according to the present invention is shown in FIG. 4. The size of BL LCU 410 is 2N×2N. The size of EL LCU 420 is inferred as (2N×a)×(2N×a), where a corresponds to 2 in this case. For SNR or temporal scalability, the EL picture resolution may be the same as the BL picture resolution. In this case, the EL LCU size is inferred to be equal to the BL LCU size without signaling.

If an EL LCU is in the same type of slice (i.e. Intra slice or Inter slice) as its corresponding BL LCU, the EL LCU may inherit the CTB structure of the corresponding BL LCU, including CU splits, CU prediction mode, partition mode, reference picture indices and motion vectors (scaled) without signaling. The location of the corresponding BL LCU can be derived based on any known method such as the method disclosed by Segall et al. (C. Andrew Segall and Gary J. Sullivan, "Spatial Scalability within the H.264/AVC Scalable Video Coding Extension", IEEE Transactions on Circuits and Systems for Video Technology, Vol. 17, No. 9, Pages 1121-1135, September 2007). The EL may use the BL CTB as an initial CTB and further split the CTB using the "split_flag" to indicate the splitting. FIG. 4 illustrates further splitting the EL LCU based on the CTB structure inherited from the BL CTB as indicated by the dashed lines (422, 424, 426 and 428).

The maximum number of depths that an EL CU can be further split beyond its corresponding BL CU can be specified in the Sequence Parameter Set (SPS), Picture Parameter Set (PPS), Adaptive Parameter Set (APS) or slice header. In one embodiment, a 1-bit syntax element "max_num_split_el_bl_minus1" is specified in the SPS to specify the maximum number of depths that an EL CU can be split beyond its corresponding BL CU. In this case, the maximum split depth can be 1 or 2. If 2 bits are used for the syntax element, the maximum number of depths allowed will be 1 to 4. Similarly, syntax flags can be incorporated in the PPS, APS and/or slice header to indicate the maximum number of depths that an EL CU can be further split beyond its corresponding BL CU.

The minimum number of depths that an EL CU needs to be further split beyond its corresponding BL CU can also be specified in the SPS, PPS, APS or slice header. In one embodiment, a 1-bit syntax element "min_num_split_el_bl_minus1" can be incorporated in the SPS. This 1-bit syntax element specifies that the minimum number of depths for an EL CU to be further split beyond the corresponding BL CU is 0 or 1. Similarly, syntax flags can be incorporated in the PPS, APS and/or slice header.

Figure 5:
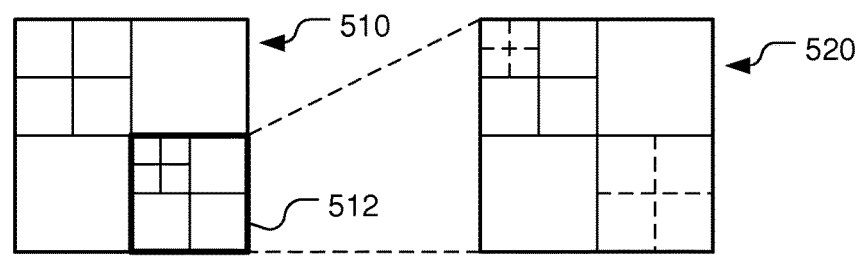
FIG. 5 illustrates an example that the EL LCU inherits the CU structure of the corresponding BL CU according to an embodiment of the present invention, where the size of the EL LCU is the same as the size of the BL LCU.

In the case that the size of the EL LCU is the same as the size of the BL LCU, if an EL LCU is in the same type of slice (i.e. Intra slice or Inter slice) as its corresponding BL CU, the EL LCU may inherit the CU structure of its corresponding BL CU without signaling according to an embodiment of the present invention. The CU structure may include CU splits, CU prediction mode and partition mode, reference picture indices and motion vectors (scaled). The location of the corresponding BL CU for the EL LCU can be derived based on any known method such as the method disclosed by Segall et al. (C. Andrew Segall and Gary J. Sullivan, "Spatial Scalability within the H.264/AVC Scalable Video Coding Extension", IEEE Transactions on Circuits and Systems for Video Technology, Vol. 17, No. 9, Pages 1121-1135, September 2007). Further split is allowed and signaled by the "split_flag". An example is shown in FIG. 5, where BL LCU 510 and EL LCU 520 are shown. The solid lines in EL LCU 520 indicate the quadtree splits inherited from corresponding BL CU 512. The dotted lines in EL LCU 520 indicate the further splits signaled by "split_flag". The maximum number of depths that an EL CU can be further split beyond its corresponding BL CU can be incorporated in the SPS, PPS, APS or slice header, using the same methods as mentioned. Similarly, the minimum number of depths that an EL CU needs to be further split beyond its corresponding BL CU can be incorporated in the SPS, PPS, APS or slice header, using the same methods as mentioned above.

Figure 6:
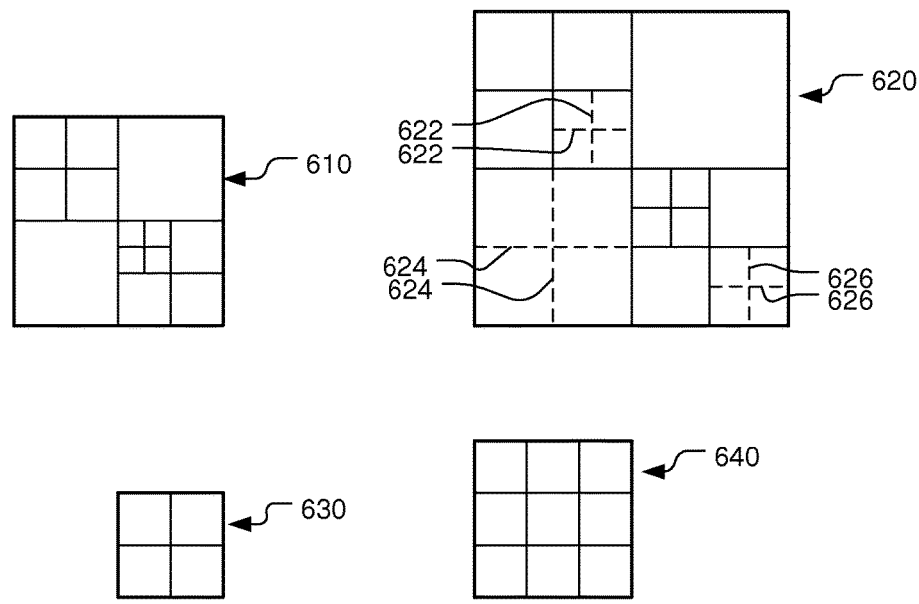
FIG. 6 illustrates examples that the EL LCU inherits the LCU structure of the corresponding BL LCU according to an embodiment of the present invention, where the system uses an arbitrary scaling factor.

While embodiments of the present invention are shown for systems with dyadic spatial scalability, the present invention is also applicable to a system with arbitrary-ratio spatial scalability. For example, if a spatial scaling factor of 1.5× is used, the EL LCU size for a BL LCU having a size 64 can be inferred as 96 without signaling. If an EL LCU is in the same type of slice (i.e. Intra slice or Inter slice) as its corresponding BL LCU, it can inherit the corresponding BL LCU structure, including CU splits, CU prediction mode and partition mode, reference picture indices and motion vectors (scaled) without signaling flag. The location of the corresponding BL LCU can be derived based on any known method such as the method disclosed by Segall et al. (C. Andrew Segall and Gary J. Sullivan, "Spatial Scalability within the H.264/AVC Scalable Video Coding Extension", IEEE Transactions on Circuits and Systems for Video Technology, Vol. 17, No. 9, Pages 1121-1135, September 2007). Further quadtree split is allowed and signaled by the "split_flag". An example is shown in FIG. 6, where the solid lines in EL LCU 620 indicate the splits that are inherited from corresponding BL LCU 610. The dotted lines (622, 624 and 626) in EL LCU 620 indicate the further quadtree splits signaled by "split_flag". The maximum number of depths that an EL CU can go further beyond its corresponding BL CU, and the minimum number of depths that an EL CU needs to further split beyond the corresponding BL CU can be incorporated in the SPS, PPS APS or slice header, using the same methods as described previously.

The smallest CU (SCU) size of the EL can be represented as the size of BL SCU multiplied by the spatial scaling factor, a. In the case of 1.5× spatial scalability, if the BL SCU is size of 8×8 (630), the EL SCU size is inferred as 12×12 (640) without signaling. When the N×N partition mode is selected for a 12×12 CU in the EL, either based on R-D decision or inherited from the corresponding an 8×8 CU partition mode in the BL, the 12×12 CU in the EL is split into nine 4×4 PUs. The merging process may be applied to form larger PUs (larger than 4×4, but less than 12×12) from these nine 4×4 PUs as shown in FIG. 6.

Figure 7:
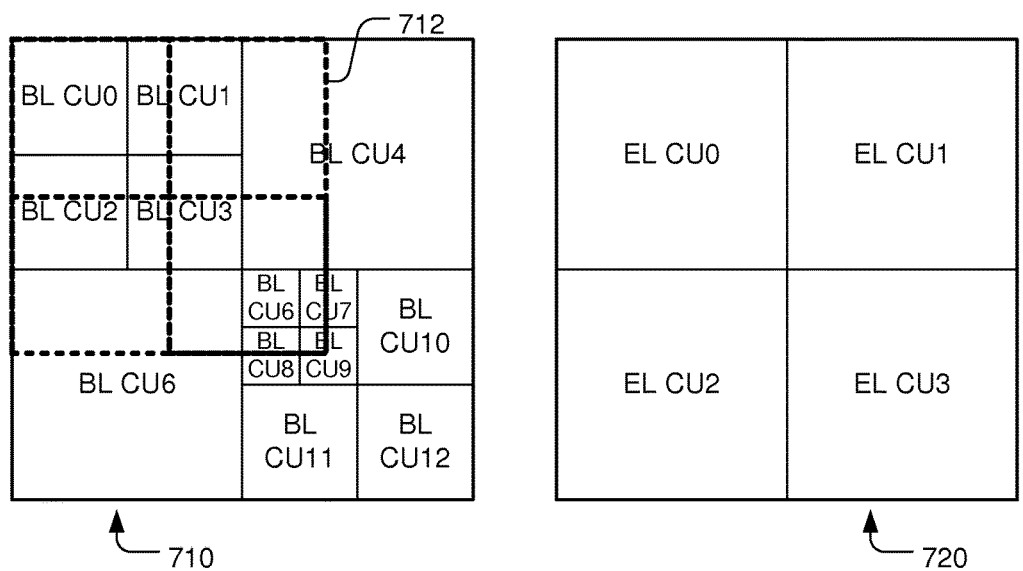
FIG. 7 illustrates an example that an EL LCU derives control parameters for the EL LCU based on control parameters associated with corresponding BL CUs, where EL LCU has the same size as the BL LCU and the spatial scaling factor is 1.5×.

Another embodiment is applied to the case that the size of the EL LCU is the same as the size of the BL LCU, as shown in FIG. 7. The CU "split_flag" in the EL can be explicitly signaled using the same manner as described in the current HEVC or other similar methods. The prediction modes, prediction partition modes, reference picture indices, motion vectors, filter parameters and transform sizes, etc. (referred as control parameters in this disclosure) of an EL CU can be predicted from the corresponding BL CU or CUs. An example is shown in FIG. 7, where BL LCU 710 and EL LCU 720 are shown and the spatial scaling factor is 1.5×. The projected EL LCU in BL LCU 710 corresponding to EL LCU 720 is indicated by the dashed lines 712. The control parameters for an EL CU can be derived based on the control parameters associated with BL CUs that overlap with the projected EL CU (712). For example, the control parameters of EL CU0 can be predicted from the control parameters associated with BL CU0, BL CU1, BL CU2 and BL CU3; and the control parameters for EL CU1 can be predicted from the control parameters associated with BL CU1, BL CU3 and BL CU4. In another embodiment, the control parameters for an EL CU can be predicted from the control parameters associated with a BL CU that has the biggest overlapped area with the projected EL CU. Accordingly, the control parameters for EL CU0 can be predicted from the control parameters associated with BL CU0; and the control parameters for EL CU1 can be predicted from the control parameters associated with BL CU4. In yet another embodiment, when an EL CU overlaps with several BL CUs and the overlapped areas have similar size, the control parameters for the EL CU can be predicted from a combination of the control parameters associated with these BL CUs. For example, the mean of motion vectors associated with these BL CUs can be used as the EL CU motion vector or motion vector predictor.

When a CU is coded in the Intra prediction mode, the information associated with a BL block can be used for Intra prediction of an EL CU. Embodiments according to the present invention may use the 35 modes as defined in the conventional non-scalable HEVC for EL luma Intra prediction. Furthermore, embodiments according to the present invention extend the 3 MPM (most probable mode) Intra mode coding method, as defined in the conventional non-scalable HEVC main profile, to EL Intra mode coding. The methods for deriving the 3 MPMs for the EL CU are described as follows.

As described previously, the CTB structure for an EL CU may inherit the CTB structure from a corresponding BL CU. If the corresponding BL CU uses Intra prediction, the Intra prediction mode selected for the BL CU can be used as one MPM for the current EL CU, referred to as Mode_BL. However, for the CTB structure derivation as illustrated in FIG. 7, if a projected EL CU only overlaps with one BL CU and if this BL CU is Intra predicted, the prediction mode of this BL CU is used as Mode_BL. If a projected EL CU overlaps with two or more BL CUs and only one of them is Intra predicted, the prediction mode of this Intra predicted BL CU is used as Mode_BL. If the projected EL CU overlaps with two or more BL CUs and if two or more of them are Intra predicted, Mode_BL can be derived based on the Intra prediction modes associated with the two or more BL CUs. For example, the prediction mode of the BL CU that overlaps with the projected EL CU the most is used as Mode_BL. If there are two or more BL CUs that have similar overlap sizes with the projected EL CU, the mean of these prediction modes (using the mode numbering defined in the conventional HEVC) can be used as Mode_BL.

The Intra prediction modes associated with the EL top and left neighboring PUs, referred as Mode_Top and Mode_Left respectively, can also be used as MPM. If Mode_BL, Mode_Top and Mode_Left are all different, Mode_BL is assigned to MPM0; Mode_Left is assigned to MPM1; and Mode_Top is assigned to MPM2. For convenience, the MPM set can also be represented as {mode_A, mode_B, mode_C} if MPM0=mode_A, MPM1=mode_B, and MPM2=mode_C. If one or more of the three MPM are missing or identical, the first three different modes among the ordered set, {Mode_BL, Mode_Left, Mode_Top, Planar, DC, Vertical} are assigned to MPM0, MPM1 and MPM2 respectively. If all three MPM are the same, the MPM derivation procedure is described as follows:

If Mode_BL<2 (i.e. Mode_BL==Mode_Left== Mode_Top==Planar or DC), MPM0 is set to Planar, MPM1 is set to DC, MPM2 is set to Vertical.

Otherwise, MPM0 is set to Mode_BL, MPM1 and MPM2 are set to the left and right neighboring modes of Mode_BL respectively. The method for retrieving the left and right neighboring modes is the same as that is described in the conventional HEVC.

Once the three MPMs are derived using the method described above, they can be coded in the same way as described in the conventional HEVC for luma Intra mode coding. The 32 remaining modes can be coded using 5-bin fixed length codes (FLC).

One aspect of the present invention addresses spatial scalability for Intra-coded blocks. In one embodiment, if the neighboring PU adjacent to the left side or the top side of the current PU is not available or is not Intra coded, the value of candIntraPredModeA or candIntraPredModeB for the Intra mode coding of the current PU in an enhancement layer is determined according to the Intra modes of the co-located PUs in the reference layer. When the current PU has only one co-located PU in the reference layer, candIntraPredModeA or candIntraPredModeB can be set to the Intra mode of the co-located PU. Alternatively, the Intra mode of the co-located PU can be first mapped to a representing mode based on its direction. The mapping result is then assigned to candIntraPredModeA or candIntraPredModeB. Table 3 and Table 4 show two examples of direction-based mapping.

TABLE 3

| Intra Prediction Mode | Mapped to |
| --- | --- |
| 0(Intra_Planar) | 0(Intra_Planar) |
| 1(Intra_DC) | 1(Intra_DC) |
| 2~17 | 10 (horizontal prediction) |
| 18~34 | 26(vertical prediction) |

TABLE 4

| Intra Prediction Mode | Mapped to |
| --- | --- |
| 0(Intra_Planar) | 0(Intra_Planar) |
| 1(Intra_DC) | 1(Intra_DC) |
| 2~14 | 10 (horizontal prediction) |
| 15~21 | 18 (diagonal prediction) |
| 22~34 | 26(vertical prediction) |

When more than one PU in the reference layer corresponds to the current PU, the value of candIntraPredModeA or candIntraPredModeB can be set to mode IM_D, which is derived based on the co-located PUs. The Intra modes of the co-located PUs are denoted as IM_L[x], where x=0, . . . , (k−1), and k is the number of Intra modes associated with the co-located PUs. Any of the following selection methods can be used.

Intra Mode Selection Method 1.

IM_D can be derived from IM_L according to the position of the co-located PUs. The Intra mode of the PU in the lower layer that contains the sample at position (i,j) in the higher layer is selected as IM_D, where 0≤i≤(N−1) and 0≤j≤(N−1) for an N×N PU. Any sample within the PU could be selected to determine the IM_D. For example, the sample at (0,0), (1,1), (N/2,N/2), (N/2−1, N/2−1), or (N−1,N−1) can be used to determine the IM_D.

Intra Mode Selection Method 2.

IM_D can be derived based on the occurrence frequency of Intra modes in IM_L. The Intra mode with the highest occurrence frequency is selected as the IM_D.

Intra Mode Selection Method 3.

The Intra modes in IM_L are sorted according to a certain order of candidate Intra prediction modes, which may be related to the priority of Intra prediction modes. After the sorting, the Intra mode on the top of the sorted list is selected as IM_D.

Intra Mode Selection Method 4.

The IM_D is first selected according to one of the selection methods mentioned above. The IM_D is then mapped to a representing mode based on the direction. For example, the direction-based mapping shown in Table 3 and Table 4 can be used.

Intra Mode Selection Method 5.

The Intra modes in IM_L can be mapped to representative modes according to the direction. Afterwards, the one with the highest occurrence frequency is selected as the IM_D. For example, the direction-based mapping shown in Table 3 and Table 4 can be used.

In another embodiment, the most probable modes (i.e., candModeList) for an Intra-coded PU in the higher layer is derived based on the Intra modes of the co-located PUs in a lower reference layer (i.e., IM_L) and the Intra modes of the neighboring PUs in a higher layer (i.e., candIntraPredModeA and candIntraPredModeB). The Intra modes in IM_L are sorted according to their position or occurrence frequency, or the priority of the Intra modes, where any duplicating modes are removed from IM_L. Both candIntraPredModeA and candIntraPredModeB are first placed into a list of potential most probable modes P_MPM. If candIntraPredModeA is the same as candIntraPredModeB, only one of them is included in the list. Afterwards, the Intra modes in IM_L are included in the P_MPM list following the Intra modes of neighboring PUs. If any Intra mode in IM_L is the same as candIntraPredModeA or candIntraPredModeB, the duplicated Intra mode will be removed from P_MPM. The number of the most probable modes allowed in the enhancement layer is denoted as m. If the number of Intra modes in P_MPM is smaller than m, the mapping results of Intra modes in P_MPM are further added into P_MPM following the Intra modes from IM_L. Finally, the first m Intra modes in P_MPM are used as the most probable modes and are included in candModeList.

In yet another embodiment, Intra_BL is signaled for each PU in a higher layer. A flag is transmitted to indicate whether the current PU is coded with Intra_BL mode or not. If the flag indicates that the current PU is coded with Intra_BL mode, the Intra mode predictor of the current PU is derived based on the co-located PUs in the lower reference layer. Otherwise, the Intra mode predictor of the current PU is generated from the neighboring PUs in the enhancement layer.

In yet another embodiment, Intra_BL is used as one Intra prediction mode in a higher layer. If the neighboring PU adjacent to the left side or the top side of the current PU is not available or is not Intra coded, the value of candIntraPredModeA or candIntraPredModeB is set to Intra_BL. In addition, Intra_BL is used as one most probable mode and is placed in the first place of candModeList.

When Intra_BL is treated as one Intra prediction mode, there are a total of 36 candidate Intra prediction modes for the luma component. Four of them are chosen as the most probable modes while the others are coded with fixed-length binarization. Intra_BL is placed in the first place of candModeList, followed by the Intra modes of neighboring blocks and the Intra modes of co-located blocks in a reference layer. The index of the four most probable modes is signaled using a 2-bit flag.

In yet another embodiment, Intra_Planar, Intra_DC or both can be excluded from Intra prediction in the higher layer. Therefore, there will be 34 or 33 Intra modes. If Intra_BL is used as one additional Intra mode, the total number of modes will be 35 or 34. If one or two most probable modes are allowed, there will be at most 33 or 34 candidate Intra modes. The most probable mode selection methods described above can be used. For Intra mode coding of the Chroma component, Intra_Planar, Intra_DC, or both can be excluded in the higher layer.

One aspect of the present invention exploits correlation associated with Intra modes in different layers to improve coding efficiency or to reduce system complexity. In one embodiment, both the Planar and the DC modes are excluded from Intra coding at the enhancement layers. With both Planar and the DC modes excluded, there are 33 angular Intra prediction modes available for Intra mode coding of the luma component. During the Intra mode coding of the luma component at the enhancement layer, one most probable mode (denoted as candModeList[x], and x=0) is used for each luma PU. The MPM can be derived from the Intra mode of the corresponding part at the base layer (denoted as candIntraPredModeBL), the Intra mode of the neighboring PU adjacent to the left side of the current PU (denoted as candIntraPredModeA), and the Intra mode of the neighboring PU adjacent to the top side of the current PU (denoted as candIntraPredModeB).

The Intra mode of the corresponding part at the base layer (i.e., candIntraPredModeBL) is derived as follows. First, a pixel, P_EL is selected in the current unit of the enhancement layer. If the current unit is 4×4, the pixel at location (0,0), (1,1), (2,2) or (3,3) can be selected as P_EL, as illustrated in FIG. 8. Nevertheless, any other location may also be used as P_EL. If the current unit is larger than 4×4, a 4×4 unit within the current unit can be used as P_EL. FIG. 9 illustrates an example of selecting a 4×4 unit (A, B or C) within a larger unit for determining P_EL. After a 4×4 unit is selected, the pixel at location (0,0), (1,1), (2,2) or (3,3) within the selected 4×4 unit (i.e., A, B, or C) is selected as P_EL. The corresponding pixel of P_EL at the base layer is calculated as:

$$PosY\_BL = PosY\_EL * (Width\_BL / Width\_EL), \text{ and}$$

$$PosX\_BL = PosX\_EL * (Width\_BL / Width\_EL),$$

where PosY_EL and PosX_EL denote the coordinates of P_EL, PosY_BL and PosX_BL denote the coordinates of the pixel corresponding to P_EL at the base layer, and Width_BL and Width_EL denote the width of the frame at the base layer and the enhancement layer respectively. Finally, the Intra mode of the pixel (PosX_BL, PosY_BL) at the base layer is used as candIntraPredModeBL.

The most probable mode, candModeList[0] can be derived as follows:
If the corresponding pixel of P_EL at the base layer is located in an Intra-coded unit and the Intra mode candIntraPredModeBL is neither Planar mode nor DC mode,
 candModeList[0]=candIntraPredModeBL;
Otherwise,
 if candIntraPredModeA is available,
  candModeList[0]=candIntraPredModeA;
 otherwise,
  if candIntraPredModeB is available,
   candModeList[0]=candIntraPredModeB;
  otherwise,
   candModeList[0]=Intra_Angular(26).

For the chroma component, an embodiment of the present invention removes the Planar and the DC modes from inter-layer Intra mode coding of the enhancement layer. Therefore the chroma PU has 3 or 4 candidate modes depending on chroma_pred_from_luma_enabled_flag. If chroma_pred_from_luma_enabled_flag is equal to 1, there are 4 possible chroma modes as shown in Table 5. Otherwise, there are 3 candidates as shown in Table 6. The binarization of the chroma modes is shown in Table 7 and Table 8.

TABLE 5

| | IntraPredMode | | |
|---|---|---|---|
| intra_chroma_pred_mode | 26 | 10 | X (2 <= X < 35) |
| 0 | 34 | 26 | 26 |
| 1 | 10 | 34 | 10 |
| 2 | 35 | 35 | 35 |
| 3 | 26 | 10 | X |

TABLE 6

| | IntraPredMode | | |
|---|---|---|---|
| intra_chroma_pred_mode | 2 | 1 | X |
| 0 | 0 | 0 | 0 |
| 1 | 3 | 2 | 26 |
| 2 | 1 | 3 | 10 |

TABLE 7

| Value of intra_chroma_pred_mode | prefix | suffix |
|---|---|---|
| 3 | 0 | n/a |
| 0 | 1 | 10 |
| 1 | 1 | 11 |
| 2 | 1 | 0 |

TABLE 8

| Value of intra_chroma_pred_mode | prefix | suffix |
|---|---|---|
| 2 | 0 | n/a |
| 0 | 1 | 0 |
| 1 | 1 | 1 |

In another embodiment, only the Planar mode is removed from inter-layer Intra mode coding of the enhancement layer. Therefore, there are 33 angular Intra prediction modes plus the DC mode available for Intra mode coding of the luma component. During the Intra mode coding of the luma component at the enhancement layer, two most probable modes (denoted as candModeList[x], x=0 to 1) are used for each luma PU. The two most probable modes are derived from the Intra mode of the corresponding part at the base layer (denoted as candIntraPredModeBL), the Intra mode of the neighboring PU adjacent to the left side of the current PU (denoted as candIntraPredModeA), and the Intra mode of the neighboring PU adjacent to the top side of the current PU (denoted as candIntraPredModeB).

Similar to the case where the Planar mode and the DC mode are removed, the Intra mode of the corresponding part at base layer (i.e., candIntraPredModeBL) is derived as follows. First, a pixel, P_EL is selected in the current unit at the enhancement layer. If the current unit is 4×4, the pixel at location (0,0), (1,1), (2,2) or (3,3) can be selected as P_EL, as illustrated in FIG. 8. Nevertheless, any other location may also be used as P_EL. If the current unit is larger than 4×4, a 4×4 unit within the current unit can be used as P_EL. FIG. 9 illustrates an example of selecting a 4×4 unit (A, B or C) within a larger unit for determining P_EL. After a 4×4 unit is selected, the pixel at location (0,0), (1,1), (2,2) or (3,3) within the selected 4×4 unit (i.e., A, B, or C) is selected as P_EL. The corresponding pixel of P_EL at base layer is calculated as follows:

$PosY\_BL = PosY\_EL * (Width\_BL/Width\_EL)$ and $PosX\_BL = PosX\_EL * (Width\_BL/Width\_EL)$, where PosY_EL and PosX_EL denote the coordinates of P_EL, PosY_BL and PosX_BL denote the coordinates of the pixel corresponding to P_EL at the base layer, and Width_BL and Width_EL denote the width of the frame at the base layer and the enhancement layer. Finally, the Intra mode of the pixel (PosX_BL, PosY_BL) at the base layer is used as candIntraPredModeBL.

The two most probable modes candModeList[0] and candModeList[1] are derived as follows:

If the corresponding pixel of P_EL at the base layer is located in an Intra-coded unit and the Intra mode candIntraPredModeBL is not Planar,
    candModeList[0]=candIntraPredModeBL;
    if candIntraPredModeA is available and candIntraPredModeA is not equal to candIntraPredModeBL,
        candModeList[1]=candIntraPredModeA;
    otherwise,
        if candIntraPredModeB is available and candIntraPredModeB is not equal to candIntraPredModeBL,
        candModeList[1]=candIntraPredModeB;
        otherwise,
            if candIntraPredModeBL is not the vertical Intra prediction mode
                candModeList[1]=Intra_Angular(26)//the vertical Intra prediction mode
            otherwise,
                candModeList[1]=Intra_Angular(10)//the horizontal Intra prediction mode
Otherwise,
    if candIntraPredModeA is available,
        candModeList[0]=candIntraPredModeA;
        if candIntraPredModeB is available and candIntraPredModeB is not equal to candIntraPredmodeA
            candModeList[1]=candIntraPredModeB;
        otherwise,
            if candIntraPredModeA is not the vertical Intra prediction mode
                candModeList[1]=Intra_Angular(26)//the vertical Intra prediction mode
            otherwise,
                candModeList[1]=Intra_Angular(10)//the horizontal Intra prediction mode
otherwise,
    if candIntraPredModeB is available,
        candModeList[0]=candIntraPredModeB;
        if candIntraPredModeB is not the vertical Intra prediction mode
            candModeList[1]=Intra_Angular(26)//the vertical Intra prediction mode
        otherwise,
            candModeList[1]=Intra_Angular(10)//the horizontal Intra prediction mode
otherwise,
    candModeList[0]=Intra_Angular(26)//the vertical Intra prediction mode
    candModeList[1]=Intra_Angular(10)//the horizontal Intra prediction mode For the chroma component, an embodiment of the present invention removes the Planar mode. Therefore the chroma PU has 4 or 5 candidate modes depending on chroma_pred_from_luma_enabled_flag. If chroma_pred_from_luma_enabled_flag is equal to 1, there are 5 possible chroma modes as shown in Table 9. Otherwise, there are 4 candidate modes as shown in Table 10. The binarization of chroma Intra modes is shown in Table 11 and Table 12.

TABLE 9

| intra_chroma_pred_mode | IntraPredMode | | | |
|---|---|---|---|---|
| | 26 | 10 | 1 | X (0 <= X < 35) |
| 0 | 34 | 26 | 26 | 26 |
| 1 | 10 | 34 | 10 | 10 |
| 2 | 1 | 1 | 34 | 1 |
| 3 | 35 | 35 | 35 | 35 |
| 4 | 26 | 10 | 1 | X |

TABLE 10

| intra_chroma_pred_mode | IntraPredMode | | | |
|---|---|---|---|---|
| | 26 | 10 | 1 | X (0 <= X < 35) |
| 0 | 34 | 26 | 26 | 26 |
| 1 | 10 | 34 | 10 | 10 |
| 2 | 1 | 1 | 34 | 1 |
| 3 | 26 | 10 | 1 | X |

TABLE 11

| Value of intra_chroma_pred_mode | prefix | suffix |
|---|---|---|
| 4 | 0 | n/a |
| 0 | 1 | 10 |
| 1 | 1 | 110 |
| 2 | 1 | 111 |
| 3 | 1 | 0 |

TABLE 12

| Value of intra_chroma_pred_mode | prefix | suffix |
|---|---|---|
| 3 | 0 | n/a |
| 0 | 1 | 0 |
| 1 | 1 | 10 |
| 2 | 1 | 11 |

In yet another embodiment, only the DC mode is removed from inter-layer Intra mode coding of the enhancement layer. The process of Intra mode coding is the same as the process where only the Planar mode is remove. The derivation of the two most probable modes is the same as that with the Planar mode removed as described above, except that the Planar mode is substituted by the DC mode.

For the chroma component, an embodiment of the present invention removes the DC mode. Therefore the chroma PU has 4 or 5 candidate modes depending on chroma_pred_from_luma_enabled_flag. If chroma_pred_from_luma_enabled_flag is equal to 1, there are 5 possible chroma modes as shown in Table 13. Otherwise, there are 4 candidate modes as shown in Table 14. The binarization of chroma Intra modes is the same as that shown in Table 11 and Table 12 previously.

TABLE 13

| intra_chroma_pred_mode | IntraPredMode | | | |
|---|---|---|---|---|
| | 26 | 10 | 1 | X (0 <= X < 35) |
| 0 | 34 | 0 | 0 | 0 |
| 1 | 26 | 34 | 26 | 26 |
| 2 | 10 | 10 | 34 | 10 |
| 3 | 35 | 35 | 35 | 35 |
| 4 | 0 | 26 | 10 | X |

TABLE 14

| intra_chroma_pred_mode | IntraPredMode | | | |
|---|---|---|---|---|
| | 26 | 10 | 1 | X (0 <= X < 35) |
| 0 | 34 | 0 | 0 | 0 |
| 1 | 26 | 34 | 26 | 26 |
| 2 | 10 | 10 | 34 | 10 |
| 3 | 0 | 26 | 10 | X |

In yet another embodiment, neither the DC mode nor the Planar mode is removed from inter-layer Intra mode coding of the enhancement layer. Therefore, there are 33 angular Intra prediction modes plus the Planar mode and the DC mode available for Intra mode coding of the luma component, which is the same as that in HEVC. During the Intra mode coding of the luma component at the enhancement layer, three most probable modes (denoted as candModeList [x] and x=0 to 2) are used. The three most probable modes are used for each luma PU. The three most probable modes are derived from the Intra mode of the corresponding part at the base layer (denoted as candIntraPredModeBL), the Intra mode of neighboring PU adjacent to the left side of the current PU (denoted as candIntraPredModeA) and one of the neighboring PU adjacent to the top side of the current PU (denoted as candIntraPredModeB). The Intra mode of the corresponding part at the base layer (i.e., candIntraPredModeBL) can be derived the same way as that with the Planar mode, the DC mode or both removed.

The three most probable modes (candModeList[x], for x=0 to 2) can be derived as follows:
uiPredNum=0;
If the corresponding pixel of P_EL at base layer is located in an Intra-coded unit,
candModeList[0]=candIntraPredModeBL;
uiPredNum=1;
If candIntraPredModeA is available and candIntraPredModeA is not equal to candIntraPredModeBL
candModeList[1]=candIntraPredModeA;
uiPredNum=2;
If candIntraPredModeB is available and candIntraPredModeB is equal to neither candIntraPredModeBL nor candIntraPredA
candModeList[2]=candIntraPredModeB
uiPredNum=3;
If candIntraPredModeB is available and candIntraPredModeB is not equal to candIntraPredModeBL
candModeList[1]=candIntraPredModeB;
uiPredNum=2;
If candIntraPredModeA is available
candModeList[0]=candIntraPredModeA;
uiPredNum=1;
If candIntraPredModeB is available and candIntraPredModeB is not equal candIntraPredModeA
candModeList[1]=candIntraPredmodeB;
uiPredNum=2;
If candIntraPredModeB is available
candModeList[0]=candIntraPredModeB;
uiPredNum=1;
After the initial most probable modes are collected as above, there are two embodiments for deriving the final most probable modes. In the first embodiment,
If uiPredNum is equal to 0
candModeList[0]=Intra_Angular(26)//the vertical Intra prediction mode
candModeList[1]=Intra_Angular(10)//the horizontal Intra prediction mode
candModeList[2]=Intra_Planar
If uiPredNum is equal to 1
If candModeList[0] is larger than 1//candModeList[0] is neither Planar nor DC
candModeList[1]=2+((candModeList[0]-2-1) % 32
candModeList[2]=2+((candModeList[0]-2+1) % 32
Otherwise,
if the corresponding pixel of P_EL at base layer is located in an Intra-coded unit (which means candIntraPredModeBL is available)
candModeList[2]=candModeList[0];
candModeList[0]=Intra_Angular(26)//the vertical Intra prediction mode
candModeList[1]=Intra_Angular(10)//the horizontal Intra prediction mode
Otherwise,
candModeList[0]=Intra_Planar
candModeList[1]=Intra_DC
candModeList[2]=Intra_Angular(26)//the vertical Intra prediction mode
If uiPredNum is equal to 2
if candModeList[0] is the vertical Intra prediction mode
if candModeList[1] is the horizontal Intra prediction mode
candModeList[2]=Intra_Angular(18)
Otherwise
candModeList[2]=Intra_Angular(10)//the horizontal Intra prediction mode
Otherwise,
if candModeList[0] is the horizontal Intra prediction mode
If candModeList[1] is the vertical Intra prediction mode
candModeList[2] Intra_Angular(18)
Otherwise
candModeList[2]=Intra_Angular(26)//the vertical Intra prediction mode
Otherwise,
If the candModeList[1] is the vertical Intra prediction mode
candModeList[2]=Intra_Angular(10)//the horizontal Intra prediction mode
Otherwise,
candModeList[2]=Intra_Angular(26)//the vertical Intra prediction mode
In the second embodiment, the final most probable modes are derived as follows:
If uiPredNum is equal to 0
candModeList[0]=Intra_Planar
candModeList[1]=Intra_DC
candModeList[2]=Intra_Angular(26)//the vertical Intra prediction mode If uiPredNum is equal to 1
    If candModeList[0] is larger than 1
        candModeList[1]=2+((candModeList[0]−2−1) % 32
        candModeList[2]=2+((candModeList[0]−2+1) % 32
    Otherwise,
        candModeList[0]=Intra_Planar
        candModeList[1]=Intra_DC
        candModeList[2]=Intra_Angular(26)//the vertical Intra prediction mode
If uiPredNum is equal to 2
    if candModeList[0] and candModeList[1] are not Planar
        candModeList[2]=Intra_Planar
    Otherwise
        If (candModeList[0]+candModeList[1])<2
            candModeList[2]=Intra_Angular(26)//the vertical Intra prediction
        Otherwise
            candModeList[2]=Intra_DC.

In H.264/AVC SVC, there is only one context for the inter-layer texture prediction flag and only one context for the inter-layer residual prediction flag. Embodiments according to the present invention also use the neighboring information for the context formation of the inter-layer texture prediction flag, the inter-layer differential coding flag, and the inter-layer residual prediction flag. For example, the information of the upper block and the left block can be used for deriving the context for the inter-layer texture prediction flag. If the inter-layer texture prediction flags of the upper block and the left block are both false, context #0 is used. Otherwise if the inter-layer texture prediction flags of the upper block and the left block are both true, context #2 is used. Otherwise, context #1 is used.

If the neighboring information is associated with a block from a row of blocks above the current block, a line buffer may be required to store the neighboring information. In order to eliminate the line buffer requirement, an embodiment only uses the neighboring information of the left block to derive the context for the inter-layer texture prediction flag. If the inter-layer texture prediction flag of the left block is false, context #0 is used. Otherwise, context #1 is used.

In H.264/AVC SVC, the Intra availability flag for a block coded using inter-layer texture prediction is 0. The corresponding Intra mode of the inter-layer texture prediction coded block is regarded as a DC mode. The use of the DC mode as a default Intra mode may degrade the coding efficiency of the inter-layer texture prediction coded block. Embodiments of the present invention use the base layer Intra prediction modes to derive Intra mode prediction for the inter-layer texture prediction coded block.

In one embodiment, if the neighboring block is an inter-layer texture prediction coded block, the corresponding base layer Intra prediction mode of the neighboring block is used for MPM derivation.

In another embodiment, if a block is coded using inter-layer texture prediction, the Intra prediction mode(s) of this block is set to the Intra prediction mode(s) of the co-located block(s) in base layer. The Intra prediction modes for smallest units (SUs) in this block can be different or the same. If different Intra prediction modes are used for the SUs, the Intra prediction mode of each SU in the enhancement layer is set to the Intra prediction mode of the co-located SU in the base layer. If the same Intra prediction mode is used for the SUs within a block, the Intra prediction mode for this block is set to the Intra prediction mode of the co-located block in the base layer. The co-located block in the base layer can be derived from a predefined point/block/SU in the current block. For example, the co-located block in the base layer corresponding to the current block can be at the upper-left point/block/SU (1010) or the center point/block/SU (1020) in the base layer as shown in FIG. 10. Since the base layer Intra prediction mode is used, coding information associated with the base layer can be used for the enhancement layer. Accordingly, the mode dependent transform and the mode dependent coefficient scan can be applied to the inter layer texture prediction coded block.

In HEVC, a block may be Intra coded (i.e., MODE_INTRA) or Inter coded (i.e., MODE_INTER or MODE_MERGE). The coefficient coding for Intra-coded block and Inter-coded block are different. One major difference is that the Intra-coded block does not have to code the flag, no_residual_syntax_flag. The flag, no_residual_syntax_flag is used to indicate whether the block has at least one non-zero coefficient. If no_residual_syntax_flag is true, the decoder can set values of all the coefficients in this block as zero and skip coefficient decoding.

The inter layer texture prediction coded block is usually treated as an Intra-coded block. In one embodiment, the inter layer texture prediction coded block is treated as an Inter block. Accordingly, the prediction mode of the inter layer texture prediction coded block is set to MODE_INTER. The flag, no_residual_syntax_flag is coded for the inter layer texture prediction coded block. The residual coding for inter block is applied for the coefficient coding. Since the prediction mode is set to MODE_INTER, the Inter prediction direction (inter_pred_idc) cannot be 0 and reference frame indexes (refIdx) cannot be all unavailable. Therefore, these conditions have to be avoided. For example, the inter_pred_idc can be set to 1, the refIdex of LIST_0 can be set to 0, and the MV can be set to (0,0).

In another embodiment, the inter layer texture prediction coded block is treated as an Intra block. The prediction mode of the inter layer texture prediction coded block is set to MODE_INTRA and one no_residual_syntax_flag is coded for the inter layer texture prediction coded block. An exemplary syntax design for a coding unit incorporating an embodiment of the present invention is shown in Table 15. Additional syntax elements included are shown in bold. The flag, no_residual_syntax_flag is included if the test condition is satisfied. Syntax element BLPredFlag is included in the test condition, where BLPredFlag indicates whether the block is coded in inter layer texture prediction.

TABLE 15

| | Descriptor |
|---|---|
| coding_unit( x0, y0, log2CbSize ) { | |
|   if( transquant_bypass_enable_flag ) { | |
|     cu_transquant_bypass_flag | ae(v) |
|   } | |
| ... ... ... | |
|   if( !pcm_flag ) { | |
|     if((PredMode[x0][y0] != MODE_INTRA \|\| BLPredFlag[x0][y0]) && | |
|       !(PartMode = = PART_2Nx2N && | |
|       merge_flag[x0][y0]) ) | |
|       no_residual_syntax_flag | ae(v) |
|     if( !no_residual_syntax_flag ) { | |
|       MaxTrafoDepth = ( PredMode[ x0 ][ y0 ] = = MODE_INTRA ? | |
|         max_transform_hierarchy_depth_intra + IntraSplitFlag : | |
|         max_transform_hierarchy_depth_inter ) | |
|       transform_tree( x0, y0 x0, y0, log2CbSize, 0, 0 ) | |
|     } | |
|   } | |
| } | |

Figure 11:
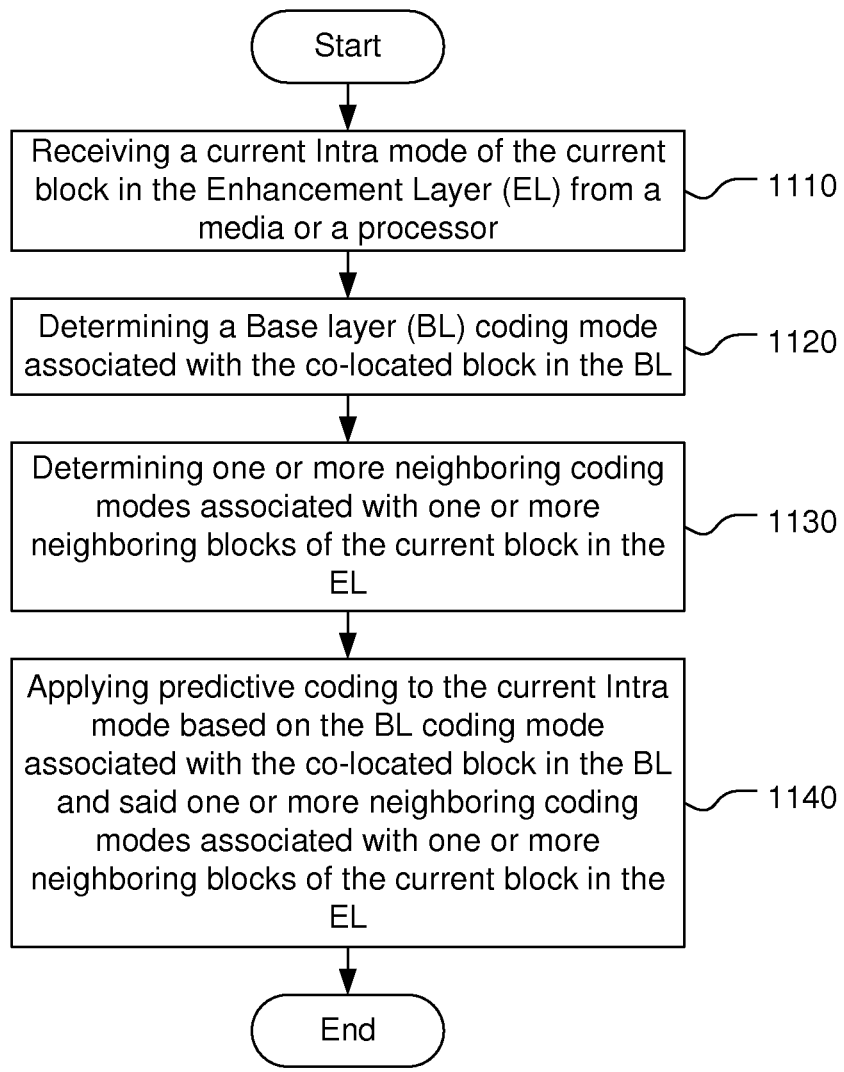
FIG. 11 illustrates an exemplary flowchart of a scalable coding system incorporating an embodiment of the present invention to code the Intra code in the enhancement layer.

FIG. 11 illustrates an exemplary flowchart of a scalable coding system incorporating an embodiment of the present invention to code the Intra code in the enhancement layer.

Figure 1:
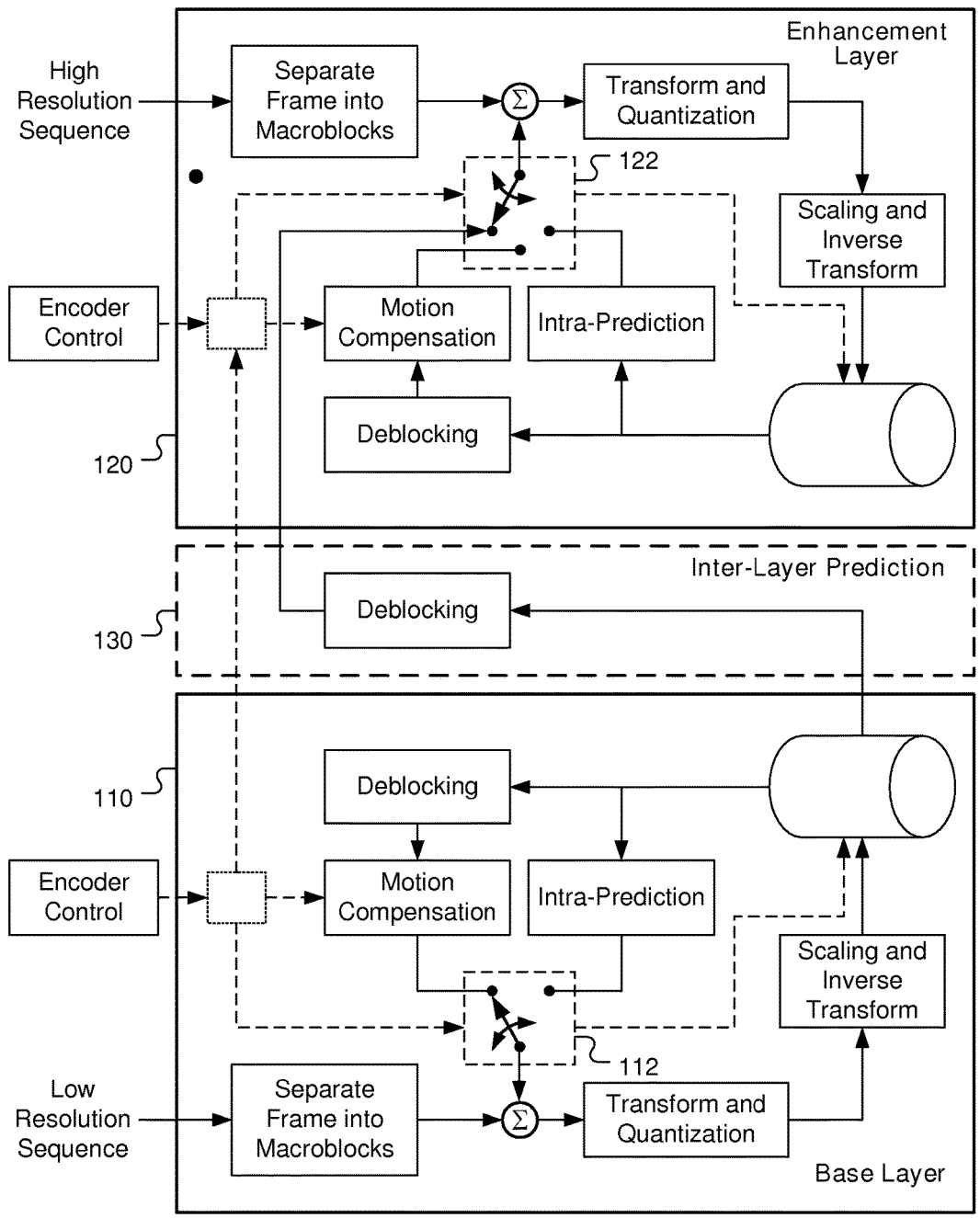
FIG. 1 illustrates an exemplary system block diagram for two-layer scalable coding based on the H.264/AVC scalable coding standard.
Figure 2A:
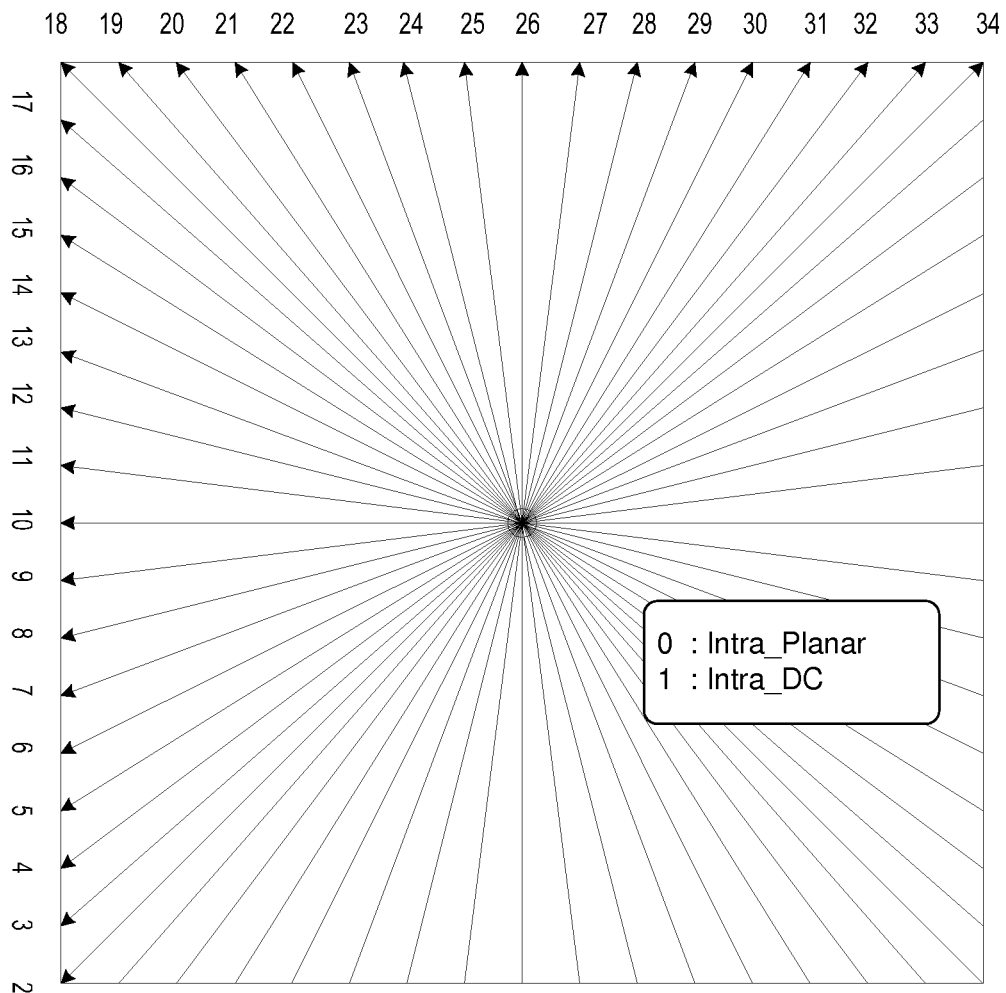
FIG. 2A illustrates the 35 Intra prediction modes adopted by HEVC Test Model Version 6.0 (HM-6.0).
Figure 2B:
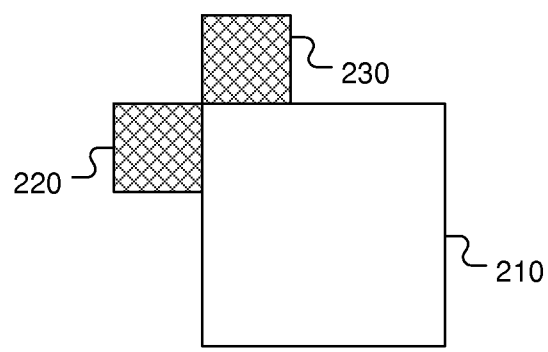
FIG. 2B illustrates the neighboring blocks used to derive Intra mode prediction according to HEVC Test Model Version 6.0 (HM-6.0).
Figure 3:
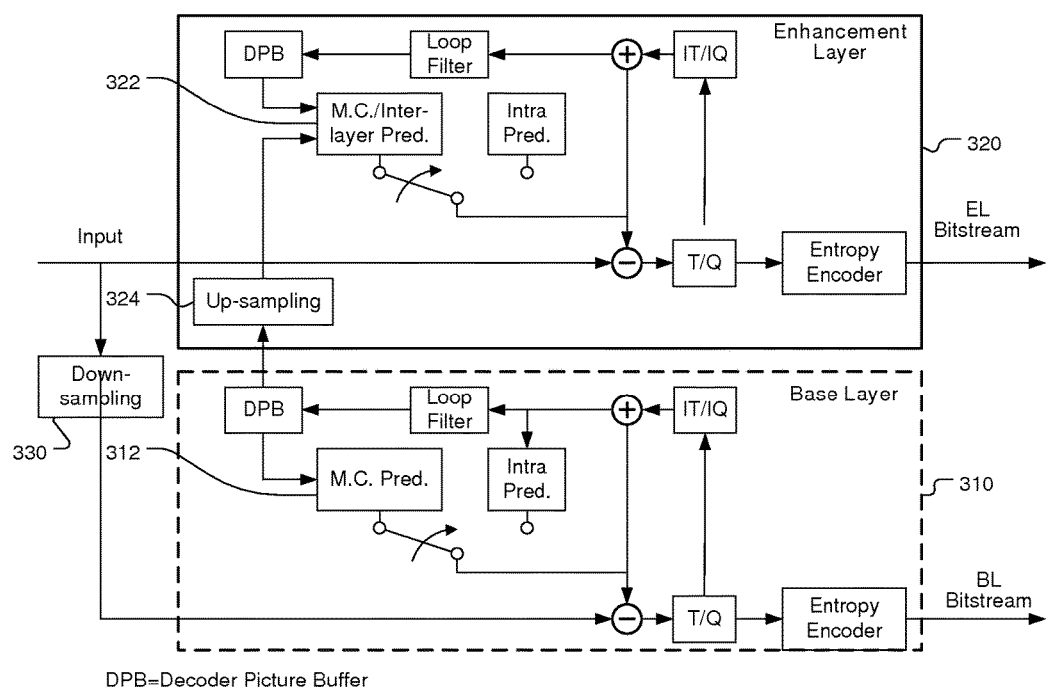
FIG. 3 illustrates an exemplary system block diagram for two-layer scalable coding based on the HEVC scalable coding standard under development.

The process is applied to a system where video data is configured into a Base Layer (BL) and an Enhancement Layer (EL). The EL has higher spatial resolution or better video quality than the BL. A co-located block in the BL corresponding to a current block in the EL is coded before the current block and the current block is Intra coded. The process starts with receiving information associated with a current Intra mode of the current block in the EL from a media or a processor as shown in step 1110. For an encoder, the current Intra mode of the current block in the EL may have been determined and stored in a media and the current Intra mode needs to be retrieve from the media in this case. The media may be computer memory, buffer (RAM or DRAM) or other storage devices/media. In hardware based implementation, the current Intra mode of the current block in the EL may be determined by a processor such as a controller, a central processing unit, a digital signal processor, or electronic circuits. In a decoder, information associated with a current Intra mode of the current block in the EL corresponds to coded data related to the current Intra mode. The coded Intra mode needs to be predicatively decoded. The base layer (BL) coding mode associated with the co-located block in the BL is determined in step 1120. Means for coding mode determination is known in the art. For example, the mode decision method as described in the HEVC reference software may be used. One or more neighboring coding modes associated with one or more neighboring blocks of the current block in the EL is determined in step 1130. The neighboring blocks can be selected according to FIG. 2B and other neighboring blocks may also be used. Coding is then applied to the current Intra mode based on the BL coding mode associated with the co-located block in the BL and said one or more neighboring coding modes associated with one or more neighboring blocks of the current block in the EL as shown in step 1140. In an encoder, the current Intra mode is encoded using prediction including the BL coding mode associated with the co-located block in the BL and said one or more neighboring coding modes associated with one or more neighboring blocks of the current block in the EL. In a decoder, the decoded current Intra is decoded using prediction including the BL coding mode associated with the co-located block in the BL and said one or more neighboring coding modes associated with one or more neighboring blocks of the current block in the EL. At the end of the process, the current Intra mode is encoded (in an encoder) or decoded (in a decoder).

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Intra mode coding for a scalable video coding system, wherein video data is configured into a Base Layer (BL) and an Enhancement Layer (EL), wherein the EL has higher spatial resolution or better video quality than the BL, a co-located block in the BL corresponding to a current block in the EL is coded before the current block, and the current block is Intra coded, the method comprising:
  receiving information associated with a current Intra mode of the current block in the EL from a media or a processor;
  determining a BL coding mode associated with the co-located block in the BL;
  determining one or more neighboring coding modes associated with one or more neighboring blocks of the current block in the EL; and
  applying predictive coding to the current Intra mode based on the BL coding mode associated with the co-located block in the BL and said one or more neighboring coding modes associated with one or more neighboring blocks of the current block in the EL,
  wherein if one neighboring block of the current block in the EL is not available or is not Intra coded, a neighboring coding mode associated with said one neighboring block is replaced by a reference BL coding mode during said predictive coding of the current Intra mode, wherein the reference BL coding mode is associated with a reference block in the BL, and wherein the reference block is a neighbor co-located block in the BL corresponding to said one neighboring block of the current block in the EL.

2. The method of claim 1, wherein said one or more neighboring blocks of the current block in the EL comprise a left block adjacent to a left side of the current block and a top block adjacent to a top side of the current block, the left block is associated with a left-block coding mode, and the top block is associated with a top-block coding mode.

3. The method of claim 2, wherein two or more most probable modes are derived from the BL coding mode, the left-block coding mode and the top-block coding mode.

4. The method of claim 2, wherein three most probable modes are derived from the BL coding mode, the left-block coding mode and the top-block coding mode.

5. The method of claim 4, wherein the three most probable modes correspond to {Planar mode, DC mode, Vertical mode} if none of the BL coding mode, the left-block coding mode and the top-block coding mode is an Intra mode.

6. The method of claim 4, wherein the three most probable modes correspond to {Planar mode, DC mode, Vertical mode} if the BL coding mode, the left-block coding mode and the top-block coding mode correspond to a same Intra mode and said same Intra mode is the Planar mode or the DC mode.

7. The method of claim 4, wherein, if one or more than one member of the BL coding mode, the left-block coding mode and the top-block coding mode are an Intra mode corresponding to a same Intra mode and said same Intra mode is neither Planar mode nor DC mode, the three most probable modes correspond to {said same Intra mode, (said same Intra mode−1), (said same Intra mode+1)}.

8. The method of claim 4, wherein, if two or more than two members of the BL coding mode, the left-block coding mode and the top-block coding mode are Intra modes corresponding to a first Intra mode and a second Intra mode, and the first Intra mode is different from the second Intra mode, the three most probable modes correspond to {the first Intra mode, the second Intra mode, Planar mode} if neither the first Intra mode nor the second Intra mode equals to the Planar mode; the three most probable modes correspond to {the first Intra mode, the second Intra mode, DC mode} if neither the first Intra mode nor the second Intra mode equals to the DC mode, and one of the first Intra mode and the second intra mode equals to the Planar mode; and the three most probable modes correspond to {the first Intra mode, the second Intra mode, Vertical mode} if the first Intra mode or the second Intra mode equals to the Planar mode or the DC mode.

9. The method of claim 4, wherein, if the BL coding mode, the left-block coding mode and the top-block coding mode correspond to three different Intra modes, the three most probable modes correspond to {the BL coding mode, the left-block coding mode, the top-block coding mode}.

10. The method of claim 4, wherein if the BL coding mode, the left-block coding mode or the top-block coding mode is Planar mode, the Planar mode is excluded from the three most probable modes; and if the BL coding mode, the left-block coding mode or the top-block coding mode is DC mode, the DC mode is excluded from initial assignment of the three most probable modes.

11. The method of claim 10, wherein, if none of the BL coding mode, the left-block coding mode and the top-block coding mode is an Intra mode not equal to Planar or DC, the three most probable modes correspond to {the DC mode, Vertical mode, Horizontal mode}.

12. The method of claim 10, wherein, if the BL coding mode, the left-block coding mode and the top-block coding mode correspond to a same angular Intra mode, the three most probable modes correspond to {the same angular Intra mode, (the same angular Intra mode−1), (the same angular Intra mode+1)}.

13. The method of claim 10, wherein, if the BL coding mode, the left-block coding mode and the top-block coding mode correspond to a first angular Intra mode and a second angular Intra mode, and the first Intra angular mode is different from the second Intra angular mode, the three most probable modes correspond to {the first Intra angular mode, the second Intra angular mode, the DC mode}.

14. The method of claim 10, wherein, if the BL coding mode, the left-block coding mode and the top-block coding mode correspond to three different angular Intra modes, the three most probable modes correspond to {the BL coding mode, the left-block coding mode, the top-block coding mode}.

15. The method of claim 2, wherein one most probable mode is derived from the BL coding mode, the left-block coding mode and the top-block coding mode.

16. The method of claim 15, wherein said one most probable mode corresponds to the BL coding mode if the BL coding mode corresponds to a first Intra mode not equal to Planar mode or DC mode; said one most probable mode corresponds to the left-block coding mode if the BL coding mode is not any Intra mode and the left-block coding mode corresponds to a second Intra mode not equal to the Planar mode or the DC mode; and said one most probable mode corresponds to the top-block coding mode if the BL coding mode and the left-block coding mode are not any Intra mode and the top-block coding mode corresponds to a third Intra mode not equal to the Planar mode or the DC mode.

17. The method of claim 15, wherein 33 angular Intra prediction modes are used for the EL and 32 remaining modes are represented by 5 bin fixed length coding.

18. The method of claim 1, wherein one or more most probable modes are derived from said one or more neighboring coding modes associated with one or more neighboring blocks of the current block in the EL and the BL coding mode associated with the co-located block in the BL, and said one or more most probable modes are used for said predictive coding of the current Intra mode.

19. The method of claim 1, wherein a most probable mode set is determined for coding to the current Intra mode based, and the most probable mode set comprises at least one most probable mode.

20. An apparatus of Intra mode coding for a scalable video coding system, wherein video data is configured into a Base Layer (BL) and an Enhancement Layer (EL), wherein the EL has higher spatial resolution or better video quality than the BL, a co-located block in the BL corresponding to a current block in the EL is coded before the current block, and the current block is Intra coded, the apparatus comprising:

at least one circuit configured for performing the steps of:
determining a current Intra mode of the current block in the EL;
determining a BL coding mode associated with the co-located block in the BL;
determining one or more neighboring coding modes associated with one or more neighboring blocks of the current block in the EL; and
applying predictive coding to the current Intra mode based on the BL coding mode associated with the co-located block in the BL and said one or more neighboring coding modes associated with one or more neighboring blocks of the current block in the EL,
wherein if one neighboring block of the current block in the EL is not available or is not Intra coded, a neighboring coding mode associated with said one neighboring block is replaced by a reference BL coding mode during said predictive coding of the current Intra mode, wherein the reference BL coding mode is associated with a reference block in the BL, and wherein the reference block is a neighbor co-located block in the BL corresponding to said one neighboring block of the current block in the EL.

21. The apparatus of claim 20, wherein said one or more neighboring blocks of the current block in the EL comprises a left block adjacent to a left side of the current block and a top block adjacent to a top side of the current block, the left block is associated with a left-block coding mode, and the top block is associated with a top-block coding mode, and one or more most probable modes are derived from the BL coding mode, the left-block coding mode and the top-block coding mode.

22. The apparatus of claim 20, wherein one or more most probable modes are derived from said one or more neighboring coding modes associated with one or more neighboring blocks of the current block in the EL and the BL coding mode associated with the co-located block in the BL, and said one or more most probable modes are used for said predictive coding of the current Intra mode.

* * * * *